UNITED STATES PATENT OFFICE 1,946,245

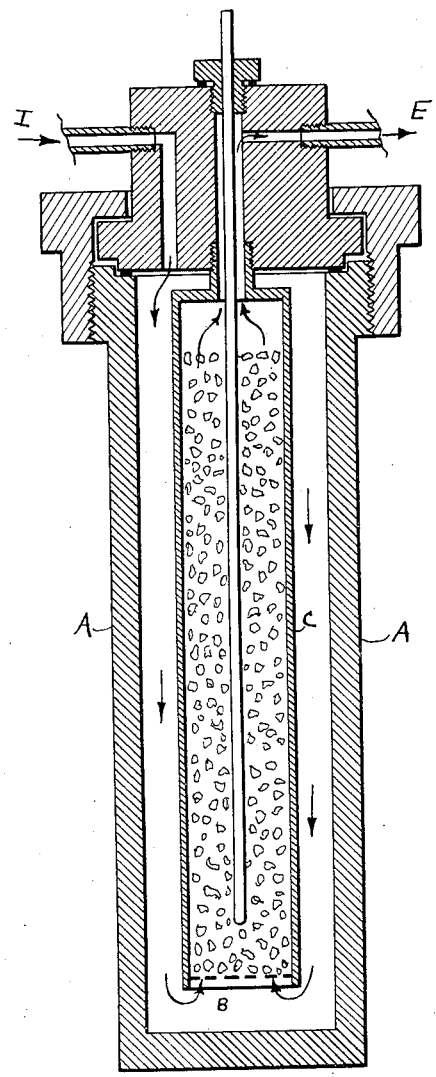

PRODUCTION OF METHYL AMINE FROM DIMETHYL ETHER

Lloyd C. Swallen, Terre Haute, Ind., assignor to Commercial Solvents Corporation, Terre Haute, Ind., a corporation of Maryland Application October 11, 1929. Serial No. 399,110

3 Claims. (Cl. 260—127)

My invention relates to a method of making methyl amine. More particularly, it relates to the process of producing methyl amine from dimethyl ether and ammonia.

In the past, many methods of making methyl amine have been suggested, but the actual manufacture has always been found difficult due to the fact that monomethyl amine is never the sole product of the reaction and the subsequent separation of this from the by-products such as dimethyl and trimethyl amine has always proven an expensive procedure. Therefore, the most satisfactory process depends not so much upon the initial cost of the reacting substances as upon the percentage of by-products formed during the reaction.

I have now found that high conversions of the reacting materials may be obtained by treating dimethyl ether with ammonia in the presence of a suitable catalyst. My new method has the important added advantage of giving unusually high proportions of the monomethyl amine. The latter feature is of particular importance in certain cases where the monomethyl amine alone is desired due to the difficulties experienced in separating the different amines and the excess ammonia which is usually necessary.

The character of the catalyst used to accelerate the reaction plays a very important part in the operation. While a number of different catalysts have been satisfactorily employed, I have found that the following one gives most excellent results: To two liters of water are added 200 grams of crystalline aluminium nitrate $(Al(NO_3)_3)$ and 200 grams of infusorial earth. Ammonium hydroxide is next added in slight excess. After washing thoroughly and drying in the air, the precipitate is broken up and screened to 6–10 mesh. Under the conditions of the reaction the aluminium hydroxide is apparently completely converted to aluminium oxide. Other precipitated forms of aluminium hydroxide and various forms of naturally occurring alumina may be used as catalysts with satisfactory results.

In manufacturing methyl amine by my new process the dimethyl ether may be obtained by any suitable method. A convenient method is to produce the dimethyl ether just as needed for the production of methyl amine. For example, methanol may be fed at the desired rate into a liter distilling flask provided with a condenser and receiver. In this distilling flask is placed about 150 c. c. of concentrated sulphuric acid and a small amount of methanol, the mixture being maintained at a temperature of about 150° C. As the dimethyl ether is evolved further methanol is added to the flask thru an inlet extending below the surface of the acid. In this manner the methanol is partially converted into dimethyl ether which passes directly into the catalyst chamber, the condenser and receiver serving to retain the unconverted methanol and the water formed during the conversion of methanol to dimethyl ether. Or, if desired, the dimethyl ether may be obtained by passing methanol over an alumina catalyst maintained at a temperature of about 300°C.

The apparatus used may also be suitably modified in a number of ways. I have found, however, that an apparatus of the type described below and illustrated in the accompanying diagram permits of a very satisfactory method of operation. This form of apparatus consists of a cylindrical outer shell A in which is placed a smaller catalyst chamber C so disposed as to provide an annular space between the two vessels. The inner vessel, which serves as a catalyst chamber, is provided with a removable perforated bottom B and is connected at the top to the gas outlet E from the catalytic apparatus. Suitable means of heating the apparatus is also provided in the form of electrical heating coils or other means.

In carrying out the production of methyl amine by my new process, dimethyl ether and ammonia are mixed in the required proportions and introduced into the catalytic apparatus near the top through the gas inlet designated as I. The gases then pass down thru the annular space between the inner and outer vessels and surrounding the catalyst, thereby being heated to the reaction temperature; after which, they pass thru the perforated bottom of the catalyst chamber up thru the catalyst contained therein and out of the catalyst apparatus to condensers and receivers. The results shown in the table below indicate the effect of changing various operating conditions. In each of these cases the catalyst employed was that specifically described above. Columns two and three indicate the space velocities, or rates at which the two reactant gases are passed over the catalyst. Column four shows the temperatures at which the catalyses were effected. Columns five and six indicate the proportions of reactants converted into methyl amine.

Table

| No. | Me₂O mols per 100 cc. of cat. per hr. | NH₃ mols per 100 cc. of cat. per hr. | Space velocity liters reactants per liter cat. per hr. | Cat. temp. °C. | Conversion NH₃ % | Conversion Me₂O % |
|---|---|---|---|---|---|---|
| 1 | .3  | .37 | 150 | 300 |     | 11.5 |
| 2 | .33 | .33 | 148 | 325 | 14  | 14.0 |
| 3 | .25 | .37 | 145 | 350 |     | 21.0 |
| 4 | .33 | .37 | 157 | 400 | 66  | 73.0 |

In selecting the operating conditions suitable for giving the best results a number of factors must be taken into consideration. The reaction may be carried out at temperatures ranging from about 300° C. to about 450° C., better yields of the monomethyl amine being obtained at temperatures ranging from about 400° to 450° C. The reactants may be passed over the catalyst at space velocities ranging from about 100 to about 2,000. For example in run No. 1 in the above table a total of .67 mol of gaseous reactants was passed over 100 cc. of catalyst per hour. This equals 6.7 mols of reactants per liter of catalyst per hour, or approximately 150 liters of reactants per liter of catalyst per hour, the volume of the gaseous reactants being calculated for standard conditions. Satisfactory results may be obtained by using equimolecular quantities of the reactants, but somewhat better results are produced when an excess of ammonia, say two mols to one of dimethyl ether is employed.

The methyl amine prepared according to my new process consists of approximately 70% of the monomethyl amine, the remainder being principally dimethyl and trimethyl amines.

It is understood, of course, that the conditions under which my process may be carried out may be modified in a number of ways depending upon the requirements of each individual case, and that for this reason I do not limit myself to the specific conditions outlined hereinabove but claim generally the method of preparing methyl amine from dimethyl ether and ammonia.

What is claimed is:

1. Process for the production of methyl amine which comprises subjecting to the action of an aluminum oxide catalyst at temperatures ranging from 300–450° C. a mixture of gaseous dimethyl ether and ammonia, the molar ratio of ammonia to dimethyl ether ranging from 1 mol $NH_3$ per mol $Me_2O$ to 2 mols $NH_3$ per mol $Me_2O$.

2. Process for the production of monomethyl amine which comprises passing gaseous dimethyl ether and an excess of gaseous ammonia at temperatures ranging from 300° to 450° C. over a catalyst initially comprising precipitated aluminium hydroxide at space velocities ranging from 100 to 2,000 volumes of reactant gas per hour per volume of catalyst.

3. Process for the production of monomethyl amine which comprises passing gaseous dimethyl ether and an excess of gaseous ammonia at temperatures ranging from 300° to 450° C. over an aluminium oxide catalyst at space velocities ranging from 100 to 2,000 volumes of reactant gas per hour per volume of catalyst.

LLOYD C. SWALLEN.